R. H. HELSEL.
WEIGHING SCALE.
APPLICATION FILED JAN. 26, 1916.
1,235,974.
Patented Aug. 7, 1917.
2 SHEETS—SHEET 1.
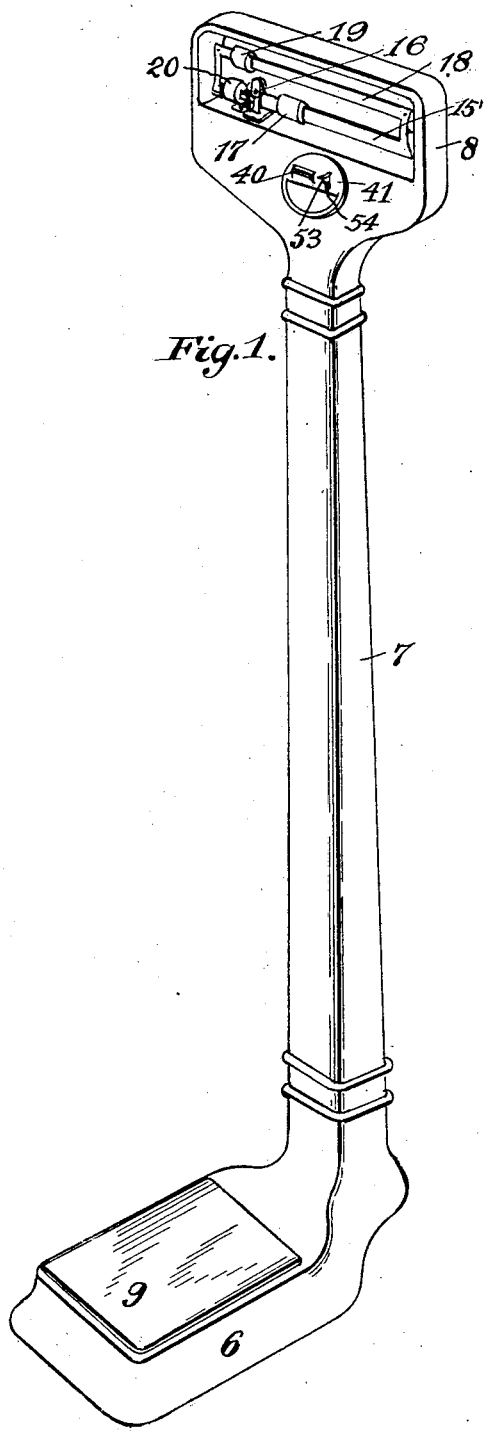
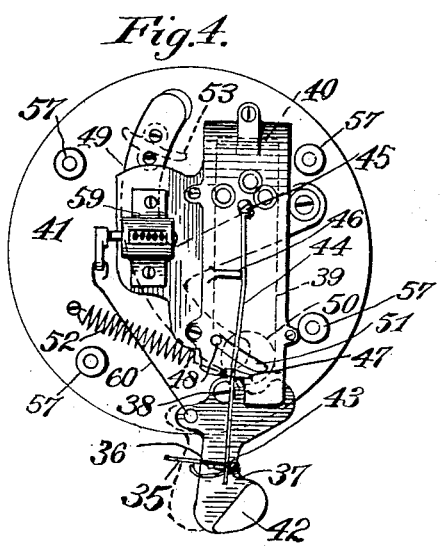
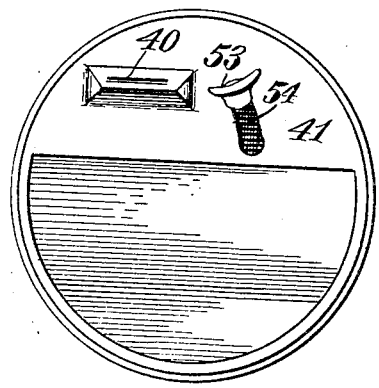
Inventor
Reuben H Helsel
By
Attorney

R. H. HELSEL.
WEIGHING SCALE.
APPLICATION FILED JAN. 26, 1916.

1,235,974.

Patented Aug. 7, 1917.
2 SHEETS—SHEET 2.

Inventor
Reuben H. Helsel
By his Attorney
John O. Seifert

---

UNITED STATES PATENT OFFICE.

REUBEN H. HELSEL, OF NEW YORK, N. Y., ASSIGNOR TO COLUMBIA WEIGHING MACHINE COMPANY, OF NEW YORK, N. Y., A CORPORATION OF NEW JERSEY.

WEIGHING-SCALE.

1,235,974.  Specification of Letters Patent.  Patented Aug. 7, 1917.

Application filed January 26, 1916. Serial No. 74,307.

*To all whom it may concern:*

Be it known that I, REUBEN H. HELSEL, a citizen of the United States, residing in the borough of Manhattan, in the city, county, and State of New York, have invented new and useful Improvements in Weighing-Scales, of which the following is a specification.

This invention relates to weighing scales in which a platform or receiver is provided upon which the load is placed and the weight of the load registered on a scale beam or beams by the adjusting of a counterweight by the person using the scale.

It is the object of the invention to provide a weighing scale of this type by which a load within a predetermined weight may be weighed, and upon placing upon the platform or receiver a load greater than such predetermined weight means are moved to coöperate with the scale beam to prevent the actuation thereof by the load on the receiver and can only be released to permit the weighing of a load greater than such predetermined weight by means operable upon the depositing of a coin in a coin chute, when such greater weight may be weighed by the adjustment of the counterweight on the scale beam by the person using the scale, and as soon as such load is removed the scale will be automatically restored to initial condition whereby a load within a predetermined weight may again only be weighed.

In carrying out my invention I provide a load receiver and a scale beam connected by weighing levers, means carried by the weighing levers coöperating with the scale beam when a load greater than a predetermined weight is placed on the receiver to prevent the operation of the scale beam, and which means is adapted to be released to permit the weighing of a load greater than such predetermined weight by a lever coöperating with a coin deposited in a coin chute, and such means being automatically restored to initial position to permit only the weighing of a load within a predetermined weight when such greater load is removed from the receiver.

In the drawing accompanying and forming a part of this specification Figure 1 is a perspective view of a weighing scale showing the general type of scale to which my invention has been applied.

Fig. 4 is a rear elevation of the coin controlled means to release the scale beam from the weighing levers to weigh a load greater than a predetermined weight.

Fig. 5 is a front elevation of a plate carrying the coin controlled means on the back thereof.

Similar characters of reference designate like parts throughout the different views of the drawing.

Figure 2:
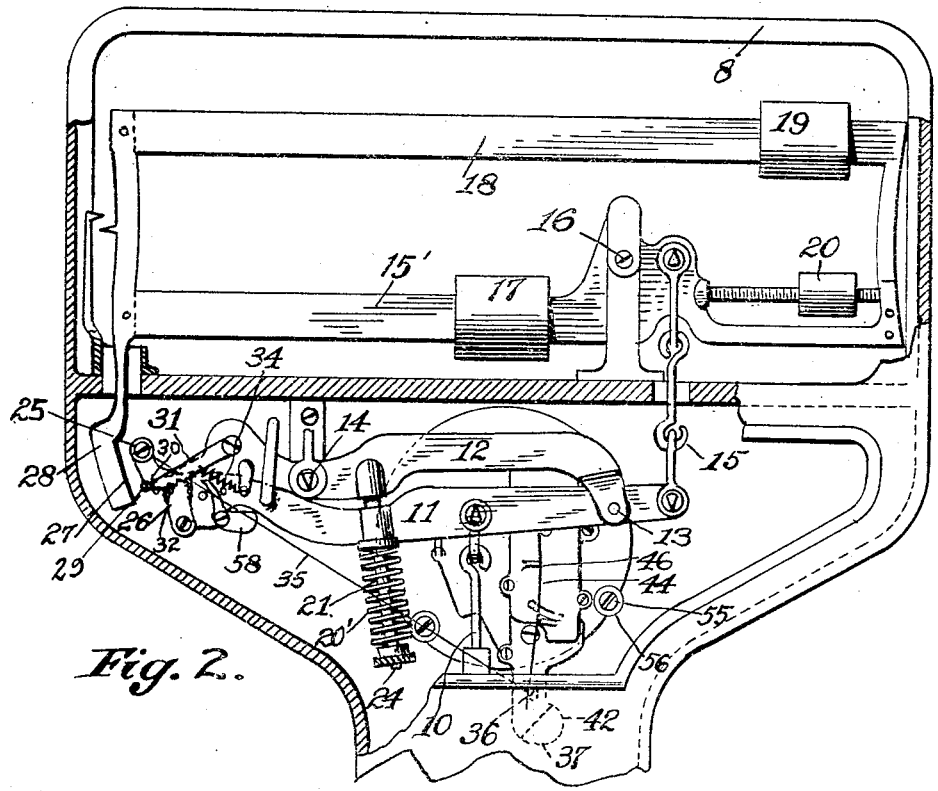
Fig. 2 is an enlarged front elevation of the upper part of the scale shown in Fig. 1, the casing being partly broken away to show an embodiment of my invention applied to the weighing mechanism, the parts being in normal position to permit of the weighing of a load within a predetermined weight.
Figure 3:
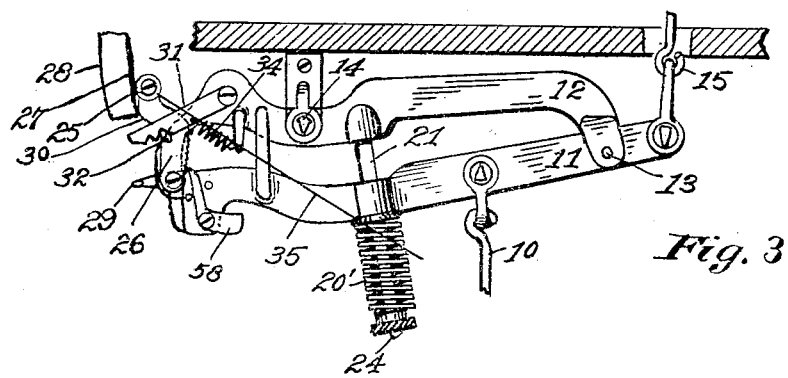
Fig. 3 is a front elevation of weighing levers through which the receiver is connected with the scale beam and having my invention applied thereto, the parts being in position to permit the weighing of a load greater than a predetermined weight.

The embodiment of my invention shown in the drawing consists of a base 6 having an upright hollow column 7, said column supporting at its upper end an open frame 8 in which the scale beam is located. A load receiver or platform 9 is supported in an opening in the top of the base 6 by suitable platform supporting levers (not shown) connected by a draft rod 10 extending up through the column 7 to an auxiliary weighing lever 11, said lever being pivotally carried by a main lever 12, as at 13, and said latter lever pivotally supported by knife edge bearings, as at 14. The auxiliary lever 11 is connected at one end to a scale beam by a link 15, the said scale beam being of the usual duplex structure having the main beam 15' pivotally supported, as at 16, and carrying the sliding counter-weight 17, an auxiliary beam 18 being connected to the beam 15' on which is adjustably mounted a weight 19, the said scale beam having the usual adjusting means as shown at 20.

As stated, it is an object of the invention to permit the weighing of a load within a predetermined weight and to prevent the weighing of a load greater than such predetermined weight. For this purpose there is provided upon the weighing levers 11 and 12 a spring 20' coiled about a threaded stem 21 fixed to lever 12 to extend down through an opening in the lever 11, the spring being confined between the lever 11 and a knurled nut 24 on the threaded end of the stem. By this construction as a load is placed on the receiver 9 it will swing the lever 11 on the pivot 13 against the tension of the spring 20' and actuate the scale beam through the link 15. However, when the load on the receiver is of such weight that it will not further compress the spring 20' the weight of the load will be taken up through the lever 11 by lever 12, the said levers then acting as a unit and imparting movement to the scale beam through the link 15. As soon as movement is imparted to the lever 12 by the load a friction member 25, in the form of a disk of suitable friction material such as fiber, felt, leather, rubber or the like, carried by the end of a dog 26 pivotally mounted on a downward projecting portion of the lever 12 engages with a cam surface 27 on a depending portion 28 of the scale beam and thereby preventing actuation of the latter. This friction member during the weighing of a load within a predetermined weight through the lever 11 is maintained out of engagement with the cam surface 27 by a projection 29 extending laterally from the lever 11 engaging with a beveled face 30 on said dog. As the lever 11 moves down and the projection slides down on the beveled face 30 and the lever reaches the limit of this movement which is regulated through the spring 20' by the nut 24 the friction member will engage with the cam surface 27. However, to assure the forcible engagement of this member with the cam surface there is provided a detent 31 having a pair of V notches in either one of which notches a pin 32 extending laterally from the dog is adapted to engage, said pin being substantially of inverted V-shape in cross section. In the normal position of the parts this pin will be caused by the projection 29 of the lever 11 engaging with the beveled face 30 to assume a position so that one beveled side of the pin will engage with the beveled side of the tooth formed by the V notches in the detent 31 adjacent its apex, as shown in Fig. 1. Should the load on the receiver be sufficient to overcome the tension of the spring 20' the pin will ride up the inclined surface of such tooth and the friction member engage with the cam surface 27 until the pin 32 will be at the bottom of the recess at the outer end of the detent 31, the pin being caused to assume such position by the tension of a spring 34 connected to the detent. It will be obvious that the greater the load on the receiver the greater will be the frictional contact between the member 25 and the cam surface 27. By the adjustment of the nut 24 on the stem 21 the tension of the spring 20' will be increased or decreased and thereby the limit to be weighed is determined without interfering with the operation of the scale beam, and it will be obvious that this may be varied to suit requirements.

To throw the friction member 25 out of engagement with the cam face 27 of the scale beam the dog is connected by a rod 35 with a trigger 37, the said rod being fixed at one end to the dog and at the other end having a pin and slot connection 36 with said trigger. The trigger is pivotally supported, as at 38, in line with a coin chute 39, registering at its upper end with a slot 40 in a plate 41, the purpose of which will be hereinafter described. The said trigger is constructed to constitute the bottom of the coin chute and a seat for a coin deposited therein, the lower end of the trigger being weighted, as at 42, to cause it to assume a position with an abutment 43 thereon engaging with the free end of a spring 44, the said spring being fixed at one end as at 45, and engaging between abutments 46 and 47 on the coin chute. When a coin is deposited it will be engaged between the trigger and a pin 48 projecting laterally through a slide 49 extending through registering slots or openings 51 in the front and back walls of the coin chute, as shown at 50 in Fig. 4. The slide 49 is maintained in position with the pin abutting against the end of the slots 51 at the left by a spring 52. By imparting downward movement to the slide 49 by pressure applied to a finger piece 53 at the front of the plate 41 passing through a slot 54 in said plate and fixed to the slide, the pin 48 will engage with the coin 50 and cause the coin to swing the trigger on its pivot 38 against the tension of the spring 44 to the dotted line position shown in Fig. 4, the coin passing out of the coin chute into a suitable receiver (not shown). During this movement of the trigger no movement will be imparted to the rod 35 due to the pin and slot connection 36. However, as the lever is sufficiently swung by the coin to permit the latter to pass out through the coin chute the trigger will be swung backward by the spring 44, the inertia imparted to the trigger by the spring and the weighting of the trigger will cause the trigger to swing beyond its normal position shown in full lines in Fig. 4, and due to its pin and slot connection with the dog carrying friction member 25 it will pull said dog backwardly against the action of the spring detent 31 and cause the pin 32 to engage in the second recess in the detent thereby holding the friction member out of engagement with the cam surface 27 and permitting the free actuation of the scale beam. It will be noted that as the trigger is being operated by the lever through a deposited coin the spring 44 will be tensioned against abutment 46, and that after the coin drops out of the chute and the trigger is released the backward movement of the spring will be limited by the engagement thereof with the abutment 47, thus permitting the trigger to again assume its initial position shown in Fig. 4 and in position again to serve as a seat for a coin which may be deposited in the coin chute. It will be noted that all of the coin controlled mechanism is mounted on the plate 41. This facilitates the assembling of this mechanism and permits the ready removal of the same for repairs and substitution, the plate with the assembled mechanism being held in place in an opening in the frame of the casing of the scale by screws 55 passing through washers 56 having screw threaded engagement with lugs 57 on the back of the plate, and clamping it to the edges of the opening for the plate, as shown in Fig. 2.

As soon as a load greater than the predetermined weight is removed from the receiver 9 the tension of spring 20′ will cause the weighing lever 11 to assume its normal position to lie adjacent the lever 12 and as shown in Fig. 1, and during this movement of the lever 11 a pawl 58 pivotally carried by said lever 11, which had previously been caused to engage with one of a series of serrations or teeth on the back of the dog 26 when the latter was thrown out of engagement with the first recess in the detent 31 by the operation of the trigger 37 and is in engagement with the second recess in the detent 31, will exert a forward pressure on the dog 26 throwing it out of engagement with the second recess in the detent 23 against the action of its spring 34 and cause the dog to again be in position to engage with the cam surface 27 of the scale beam when a load greater than a predetermined weight is placed on the receiver, and permit the weighing of loads which are within such predetermined weight.

To keep a record of the coins deposited there is provided a suitable register or counter 59 fixed to a projecting portion of the chute, the actuating member of the counter being connected to the trigger 37 by a rod or link 60, so that each time the trigger is tripped the counter will be advanced one digit.

Having thus described my invention I claim:

1. In a weighing scale the combination of a scale beam; a receiver for the load to be weighed; a weighing lever connected to the load receiver and scale beam; means carried by the weighing lever to coöperate with the scale beam to prevent the operation of the scale beam by a load on the receiver and coin controlled means to release said latter means, substantially as and for the purpose specified.

2. In a weighing scale the combination of a scale beam; a receiver for the load to be weighed; a weighing lever connected to the load receiver and scale beam; means carried by the weighing lever to coöperate with the scale beam to prevent the operation of the scale beam by the load on the receiver; a coin chute; and a slide to coöperate with means through a coin deposited in the coin chute to release the means coöperating with the scale beam and permit the weighing of a load on the receiver.

3. In a weighing scale the combination of a scale beam having a cam portion; a receiver for the load to be weighed; a weighing lever connected to the load receiver and scale beam; a dog carried by the weighing lever to engage with the cam portion of the scale beam to prevent the actuation of the latter by a load on the receiver; a coin chute; and a slide to coöperate with means through a coin deposited in the coin chute to release the dog from the cam portion of the scale beam, substantially as and for the purpose specified.

4. In a weighing scale the combination of a scale beam having a projecting portion with a cam surface; a receiver for the load to be weighed; a weighing lever connected to the load receiver and scale beam; a dog carried by the weighing lever to engage with the cam surface of the scale beam to prevent the actuation of the latter by a load on the receiver; a coin chute; a trigger connected to the dog and constituting a seat for a coin deposited in the coin chute and a slide coöperating with a coin deposited in the coin chute to actuate the trigger and release the dog from the cam face of the scale beam, substantially as and for the purpose specified.

5. In a weighing scale the combination of a scale beam; a receiver for the load to be weighed; a main weighing lever and an auxiliary weighing lever connected to the load receiver and scale beam; means coöperating with the auxiliary weighing lever to permit the weighing of a load on the receiver within a predetermined weight; means carried by the main weighing lever to coöperate with the scale beam to prevent the operation of the scale beam and the weighing of a load on the receiver over a predetermined weight; and coin controlled means to release said latter means and permit the weighing of a load greater than said predetermined weight, substantially as and for the purpose specified.

6. In a weighing scale the combination of a scale beam; a receiver for a load to be weighed; a main weighing lever; an auxiliary weighing lever carried by the main weighing lever and connected to the scale beam and load receiver; a spring operating between the weighing levers to permit the weighing of a load within a predetermined weight; means carried by the main weighing lever and coöperating with the scale beam to prevent the operation of the scale beam by a load on the receiver grater than a predetermined weight and coin controlled means to release said latter means, substantially as and for the purpose specified.

7. In a weighing scale the combination of a scale beam; a receiver for a load to be weighed; a main weighing lever; an auxiliary weighing lever carried by the main weighing lever and connected to the scale beam and load receiver; a spring operating between the weighing levers to permit the weighing of a load within a predetermined weight; means carried by the main weighing lever and coöperating with the scale beam to prevent the operation of the scale beam by a load on the receiver greater than a predetermined weight; coin controlled means to release the means carried by the weighing lever from and free the scale beam to permit the weighing of a load greater than such predetermined weight; and means carried by the auxiliary weighing lever operable when said load greater than a predetermined weight is removed from the receiver to cause the means carried by the main lever to again coöperate with the scale beam to permit actuation of the latter only by a load within the predetermined weight, substantially as and for the purpose specified.

8. In a weighing scale the combination of a scale beam; a receiver for the load to be weighed; weighing levers connected to the load receiver and scale beam; means carried by the weighing levers to permit the weighing of a load on the receiver within a predetermined weight and to coöperate with the scale beam to prevent the weighing of a load greater than such predetermined weight; and coin controlled means to disconnect the means carried by the weighing levers to coöperate with the scale beam to prevent the weighing of a load greater than a predetermined weight and permit the weighing of such load.

9. In a weighing scale the combination of a scale beam; a receiver for the load to be weighed; weighing levers connected to the load receiver and scale beam; means carried by the weighing levers to permit the weighing of a load on the receiver within a predetermined weight and to coöperate with the scale beam to prevent the weighing of a load greater than such predetermined weight; coin controlled means to disconnect the means carried by the weighing levers to coöperate with the scale beam to prevent the weighing of a load greater than a predetermined weight and permit the weighing of such load; and means operable when said greater load is removed from the receiver to restore the relation between the means carried by the weighing levers to coöperate with the scale beam and prevent the weighing of a load on the receiver greater than a predetermined weight.

10. In a weighing scale the combination of a scale beam having a cam surface; a receiver for the load to be weighed; a main weighing lever; an auxiliary weighing lever carried by the main weighing lever and connected to the scale beam and load receiver; a spring between the weighing levers to permit the actuation of the scale beam by the auxiliary lever by a load on the receiver within a predetermined weight and cause the actuation of the scale beam through both levers when weighing a load greater than such predetermined weight; a friction member carried by the main weighing lever normally out of engagement with the cam face of the scale beam during the weighing of a load on the receiver within a predetermined weight through the auxiliary scale beam; a spring detent to coöperate with said friction member to cause it to forcibly engage with the cam face of the scale beam and prevent the actuation of the latter when a load greater than such predetermined weight is placed on the receiver, and coin controlled means to release the friction member from the cam face, substantially as and for the purpose specified.

11. In a weighing scale the combination of a scale beam having a cam surface; a receiver for the load to be weighed; a main weighing lever; an auxiliary weighing lever carried by the main weighing lever and connected to the scale beam and load receiver; a spring between the weighing levers to permit the actuation of the scale beam by the auxiliary lever by a load on the receiver within a predetermined weight and cause the actuation of the scale beam through both levers when weighing a load greater than such predetermined weight; a friction member pivotally carried by the main weighing lever; a spring detent having a pair of notches in which a pin projecting laterally from the carrier for the friction member is adapted to engage and when engaging in one of said notches adapted to coöperate with said friction member to cause the latter to forcibly engage with the cam face of the scale beam and prevent the actuation of the latter when a load greater than such predetermined weight is placed on the receiver; and coin controlled means to throw said friction member out of engagement with the cam face of the scale beam and cause the laterally projecting pin to engage in the other detent notch to retain the friction member out of engagement with the cam face, substantially as and for the purpose specified.

12. In a weighing scale the combination of a scale beam having a cam surface; a receiver for the load to be weighed; a main weighing lever; an auxiliary weighing lever carried by the main weighing lever and connected to the scale beam and load receiver; a spring between the weighing levers to permit the actuation of the scale beam by the auxiliary lever by a load on the receiver within a predetermined weight and cause the actuation of the scale beam through both levers when weighing a load greater than such predetermined weight; a friction member pivotally carried by the main weighing lever; a spring detent to coöperate with said friction member to cause it to forcibly engage with the cam face of the scale beam and prevent the actuation of the latter when a load greater than such predetermined weight is placed on the receiver; coin controlled means to throw said friction member out of engagement with the cam face of the scale beam, and the friction member retained in such position by the detent; and a trip carried by the auxiliary lever operable to cause the friction member to assume a position to engage with the cam face of the scale beam when the load greater than a predetermined weight is removed from the receiver, substantially as and for the purpose specified.

13. In a weighing scale the combination of a scale beam and a load receiver; a main weighing lever; an auxiliary weighing lever carried by the main weighing lever and connected to the scale beam and load receiver; means carried by the main weighing lever to coöperate with the scale beam to prevent the weighing of a load greater than a predetermined weight; coin controlled means to release said latter means to permit weighing of loads greater than said predetermined weight; and adjustable means between the weighing levers to permit the weighing of loads of variable predetermined weights, comprising a threaded stem carried by the main weighing lever extending through an opening in the auxiliary lever, a nut on said stem, and a spring coiled about the stem confined between said nut and the auxiliary weighing lever.

14. In a weighing scale the combination with a scale beam and a load receiver, of a weighing lever connected to the scale beam and load receiver and having means to coöperate with the scale beam to prevent the actuation of the latter when a load is placed upon the receiver; and coin controlled means to release said latter means and permit the actuation of the scale beam by a load on the receiver.

15. In a weighing scale the combination of a scale beam having a cam surface; a load receiver; a weighing lever connected to the scale beam and load receiver; a friction member carried by said weighing lever to engage with the cam surface of the scale beam and prevent the actuation of the latter when a load is placed on the receiver; a coin chute; a pivoted trigger to constitute the seat of the coin chute and connected to the friction member; and a slide to coöperate with a coin deposited in the coin chute to actuate the trigger and release the friction member from the cam surface of the scale beam, substantially as and for the purpose specified.

REUBEN H. HELSEL.